No. 673,854. Patented May 7, 1901.
C. WILLIAMS & J. A. MITCHELL.
BALL BEARING.
(Application filed May 29, 1899.)
(No Model.) 2 Sheets—Sheet 1.
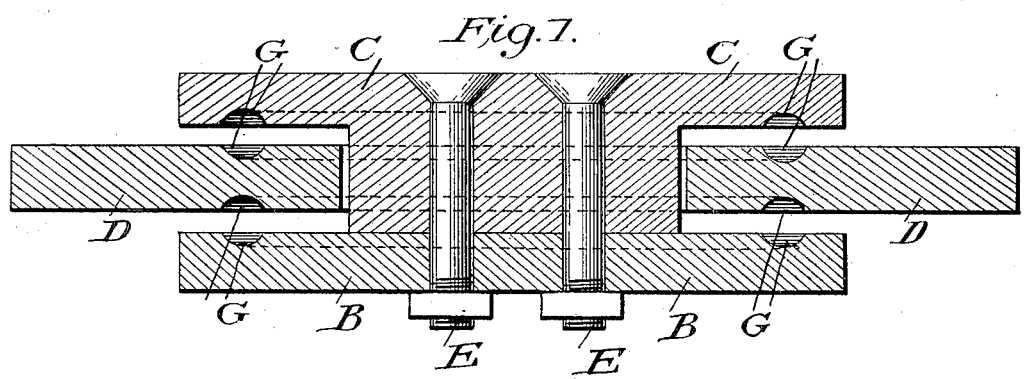
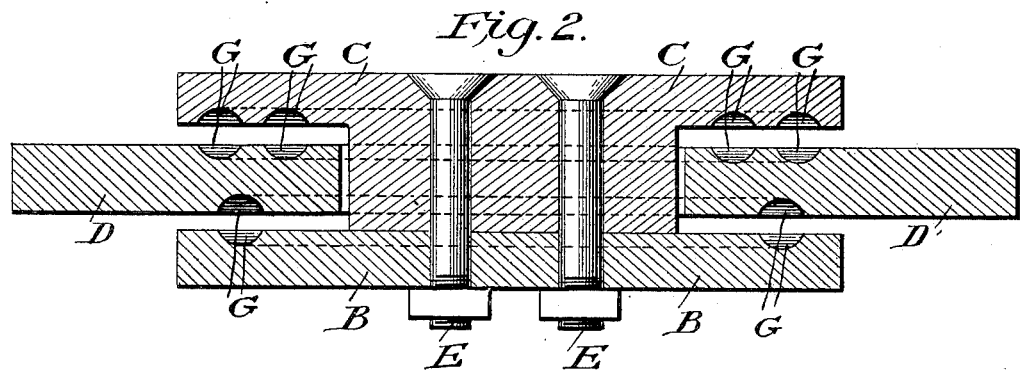
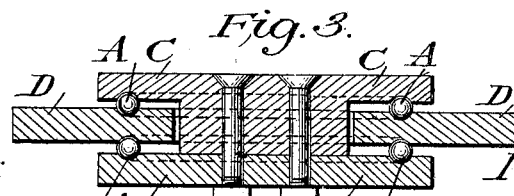
Witnesses:
David Wall
D. Frank Martin
Inventors:
Charles Williams
James A. Mitchell No. 673,854. Patented May 7, 1901.
C. WILLIAMS & J. A. MITCHELL.
BALL BEARING.
(Application filed May 29, 1899.)
(No Model.) 2 Sheets—Sheet 2.
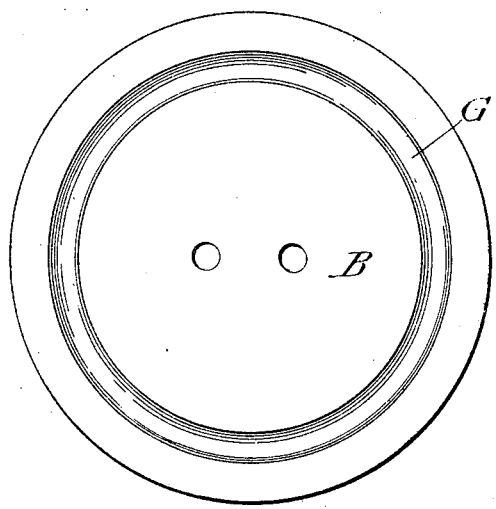
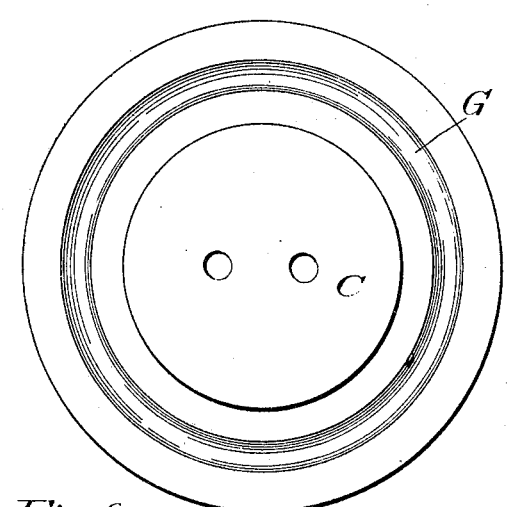
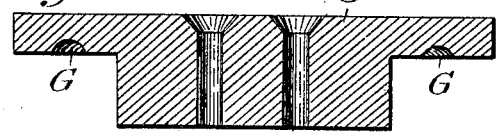
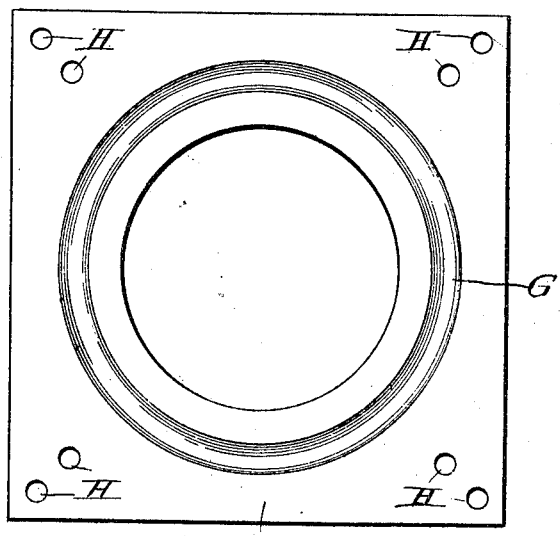
Witnesses:
D. Frank Martin
David Wall
Inventors
Charles Williams
James A. Mitchell

UNITED STATES PATENT OFFICE.

CHARLES WILLIAMS AND JAMES A. MITCHELL, OF SPOKANE, WASHINGTON.

BALL-BEARING.

SPECIFICATION forming part of Letters Patent No. 673,854, dated May 7, 1901.

Application filed May 29, 1899. Serial No. 718,789. (No model.)

*To all whom it may concern:*

Be it known that we, CHARLES WILLIAMS and JAMES A. MITCHELL, citizens of the United States, residing at Spokane, in the county of Spokane and State of Washington, have invented a new and useful Ball-Bearing Device for Turn-Tables, Drawbridges, Derricks, &c., of which the following is a specification.

Our invention relates to a ball-bearing device for turn-tables, drawbridges, derricks, vehicles, and other appliances for turning or moving weights.

Figure 1 is a cross-section of the ball-bearing device, showing the combination of the plates and the grooves for two rows of balls without the balls. Fig. 2 is a cross-section of a modification of the ball-bearing device, showing the combination of the plates and the grooves for three rows of balls without the balls. Fig. 3 is a cross-section of the ball-bearing device shown in Fig. 1 complete, showing the combination of the plates and grooves and two rows of balls contained in the grooves. Fig. 4 is the bottom metallic plate of the device, showing upper surface containing a groove for one row of metallic balls and two circular openings to fit bolts fastening the plates together in forming the device. Fig. 5 is the top or upper metallic plate of the device, showing lower or inner surface-containing groove to cover and hold in place one row of metallic balls placed in a corresponding groove in the middle plate, hereinafter described, also showing two circular holes to fit bolts fastening the plates together in forming the device. Fig. 6 is a cross-section of Fig. 5, the upper metallic plate of the device, showing circular projection of upper plate to fit circular opening in the middle plate, hereinafter described, also showing two bolts which fasten the plates together and two grooves to cover rows of balls in similar corresponding grooves in the middle plate. Fig. 7 is the middle metallic plate of the device as seen by a view of either surface, the two surfaces presenting a like view and showing grooves corresponding to similar grooves in the upper and lower plates, which grooves combined form the inclosures for the metallic balls constituting the bearings. The middle plate also shows a circular opening in its center to fit the projection of the inner side of the upper plate.

Similar letters refer to similar parts throughout the several views.

In Fig. 1, B B represent a circular metallic plate containing one groove in its upper surface and two circular holes to fit bolts fastening the device together, and constitutes the bottom or under plate of the ball-bearing device, also shown in Figs. 2, 3, and 4.

C C is a circular metallic plate with projected circular center passing through a circular opening in the middle plate, the projection coming in contact at all points with and attached to the corresponding upper surface of the lower plate. This plate with circular projection contains one groove for balls in its lower or inner side, and constitutes the top or upper plate of the ball-bearing device, also shown in Figs. 2, 3, 5, and 6.

D D is a rectangular metallic plate with circular opening in its center to fit the circular projection of C C, the upper plate, and is grooved on both upper and lower surfaces to correspond to the grooves in the upper and lower plates and constitutes the middle plate of the device, also shown in Figs. 2, 3, and 7.

G G are grooves in the metallic plates, forming practically inclosed circular spaces for the metallic balls constituting the bearings to move freely in in revolving the device, also shown in Figs. 2, 3, 4, 5, 6, and 7.

E E are bolts used to fasten the plates together in forming the device, also shown in Figs. 2, 3, and 6.

In Fig. 3, A A are rows of metallic balls, fitting loosely in and filling the inclosed circular spaces formed by the grooves in the metallic plates, arranged as shown in Figs. 1, 2, and 3.

In Fig. 7, H H H H are circular holes in plate D D for bolts to fasten the ball-bearing device to some substantial support or foundation.

What we claim as our invention, and desire to secure by Letters Patent, is—

1. The combination of three plates having annular grooves in their adjoining faces, the outer plates secured together and one of them having a projection which passes through an opening in the middle plate, and balls in the grooves, substantially as set forth.

2. The combination of three plates each having annular grooves in their adjoining faces, the middle plate being rectangular in form and stationary, one of the outer plates having a projection passing through an opening in the middle plate, bolts passing through said projection and into the other outer plate and securing them together, and balls in the aforesaid grooves, substantially as set forth.

CHAS. WILLIAMS.
JAMES A. MITCHELL.

Witnesses:
J. A. RICE,
S. P. DOMER.